May 2, 1961 K. J. MURRAY 2,982,509
SUPPORT FOR BOX OR TRAY
Filed Dec. 6, 1956 2 Sheets-Sheet 1
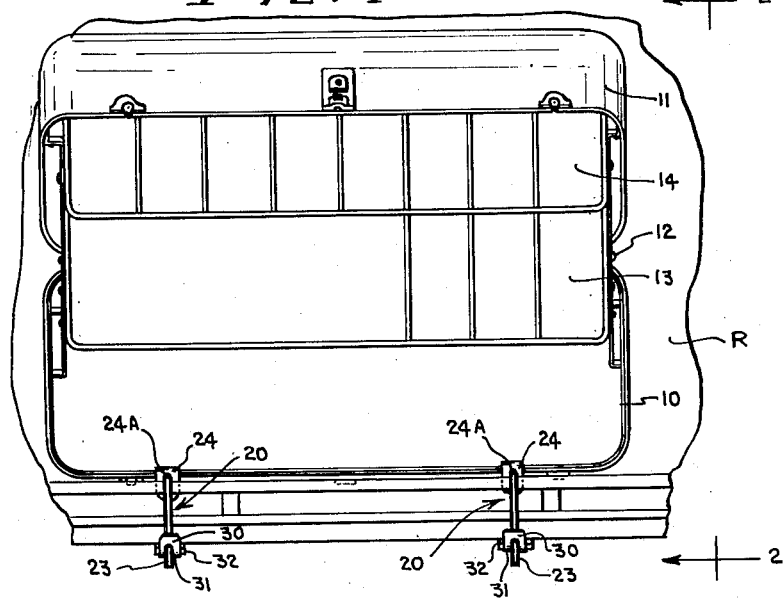
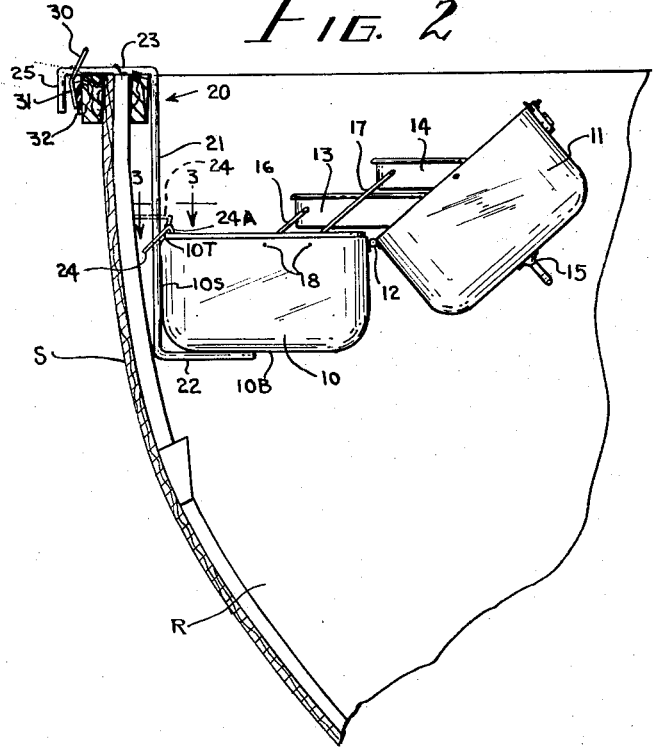
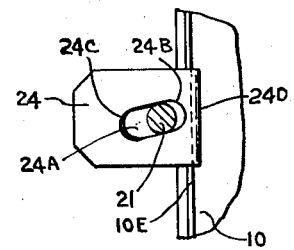
INVENTOR.
KENNETH J. MURRAY
BY
*Ralph L. Dugger*
ATTORNEY INVENTOR.
KENNETH J. MURRAY
BY Ralph L. Chugger
ATTORNEY

United States Patent Office 2,982,509
Patented May 2, 1961

2,982,509

SUPPORT FOR BOX OR TRAY

Kenneth J. Murray, 5720 Wayzata Blvd., Minneapolis, Minn.

Filed Dec. 6, 1956, Ser. No. 626,689

7 Claims. (Cl. 248—229)

This invention relates to a support which may be used for holding a box, tray or similar container having a bottom and sidewalls. The invention is particularly adapted for supporting a fishing tackle box which, according to the pattern most commonly used, has a bottom tray-like member and a top which may be closed upon the bottom tray so as to form a complete box enclosure. Usually such fishing tackle boxes include one or more interior trays which are fastened to the top and bottom portions in such a way that the interior tray or trays will be lifted and supported parallel in spaced relationship when the box cover is open. Such a container is relatively unstable when it is open, usually because the box cover does not open sufficiently so as to assume a position parallel to the bottom portion of the box and accordingly it is difficult to maintain such a box in a level position in a boat in which the fisherman may use it. In addition to the difficulty arising out of the fact that the box may be of unstable configuration when open, are other difficulties arising from the fact that the box is usually opened while in a skif which may have a rounded or slanted bottom and may be subject to considerable motion.

It is a primary object of this invention to provide a support especially adapted for supporting a box or tray-like member by suspension from a generally upwardly extending surface. More particularly it is an object of the invention to provide a support for a box or tray-like member, particularly a fishing tackle box and to provide a mode and mechanism by which such box may be supported from the gunwale of a boat. It is a further object of the invention to provide a supporting device of relatively simple construction which can be carried in the fishing tackle box itself and will not occupy much space. It is another object of the invention to provide a supporting device of general utility for supporting any box or tray-like structure from a generally upright supporting surface. It is another object of the invention to provide an improved supporting device for box or tray-like structures which device may be manufactured at low cost and yet is rugged, light in weight, and easy to use. Other further objects of the invention are those inherent in the apparatus illustrated and described and claimed.

The invention is illustrated with reference to the drawings wherein:

Figure 1 is a plan view of a metal fishing tackle box of a popular type supported from the gunwale of a row boat, only a portion of the row boat being illustrated therein.

Figure 2 is an end elevational view taken in the direction of arrows 2—2 of Figure 1 illustrating the same form of fishing tackle box supported from the gunwale of the row boat.

Figure 3 is an enlarged fragmentary sectional view taken along the line and in the direction of arrows 3—3 of Figure 2.

Figure 4:
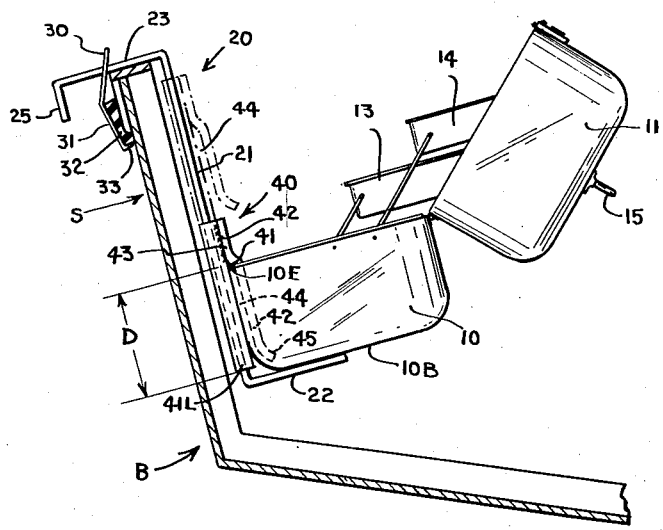
Figure 4 is an end elevational view of a fishing tackle box showing another form of the supporting device of the present invention supported from the gunwale of a skif or row boat, the boat being shown partially and in section.

To the accomplishment of the foregoing and related ends, the invention then comprises features hereinafter fully described and particularly pointed out in the claims, the following disclosure setting forth in detail illustrative embodiments of the invention, these being indicative, however, of but a few of the various ways in which the principals of the invention may be employed.

Referring to Figures 1, 2 and 3 the rowboat R includes a side S which terminates at the gunwale G. From the gunwale is supported one or more, here illustrated as two supports, generally designated 20. Each of these supports comprises a length of metal which may be a metal strap or a round metal rod. Each of the supports 20 has a lower support portion 22 which extends substantially at right angles to an upwardly extending part 21, and at its upper end is fashioned so that it can be attached to the generally upright surface from which the supporting device is hung. In the illustrated form the upwardly extending part 21 has an upper end 23, 25 in the form of a squared hook including the portion 23 at right angles to part 21 and in a direction opposite to the lower portion 22. The portion 23 extends as shown and is then provided with a downwardly extending end 25 which is generally parallel to the part 21. The portions 23 and 25 form a hook and the spacing between the portions 21 and 25 is sufficient to reach over the width of an ordinary gunwale of a row boat upon which the device is adapted to be used.

The lower portion 22 is adapted to extend along and under the bottom of the container or box 10 and the upwardly extending portion 21 is adapted to extend along the sidewall 10S of the container. The top 11 of the box 10 is provided with a handle 15 and the inside trays 13 and 14 are supported by the parallel links 16 and 17 which are pivoted to the container at their respective pivot points 18 and to the trays 13 and 14 in such a manner that when the top 11 is opened away from container 10 the inside elements 13 and 14 will be brought to the position shown in Figure 2. In this position the entire box is unstable since some of the weight in the trays 13 and 14 and the box is an over-balancing position in respect to bottom 10B and even if the box were to be placed upon a level surface the natural tendency would be for the open box to overturn, at least to a position at which some portion of the top 11 contacted that surface. This natural overturning motion is resisted by the supports 20 by means of clips 24 which are in the form of hooks that slide vertically upon the upper portion 21 of the support structures. Each clip 24 is preferably shaped as illustrated and has a hook portion 24D that extends down inside the box to a position below the top edge 10E of the container. The clip 24 has a slot 24A, the slot being somewhat narrower in width at end 24C than at end 24B. The slot 24A is preferably made so that the rod 21 will slide freely in the end 24B but will be pinched at the end 24C. In order to make the clip 24 retain the container 10, the latter is first placed with the bottom 10B against the lower support 22 and with the container sidewall 10S against the vertically extending portion 21 of the support.

Figure 6:
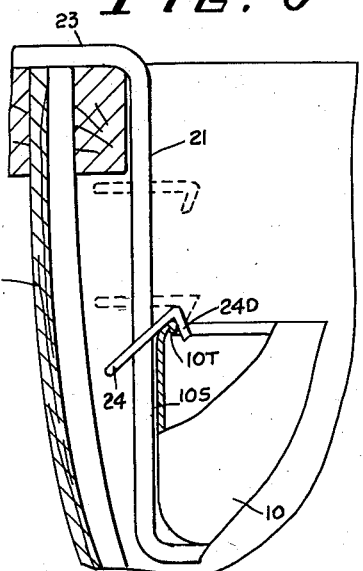
Figure 6 is an enlarged fragmentary view, part in section, to show the various positions of the clip on the central suspension portion of the hanger unit illustrated in Figure 2.

Then the clip 24 is pushed downwardly from the position shown in the dotted lines in Figure 6 adjacent the gunwale until the main body of the clip is in substantially the position shown in dotted lines in Figure 6 adjacent the upper edge of the container. As the clip reaches the upper edge 10E of the container, the end 24D hooks over the edge of the container and as the clip 24 is brought down to this position, shown in full lines in Figure 2, the narrow end 24C of the slot pinches on the rod 21 and the clip will accordingly be gripped upon the rod 21 and held from upward displacement. In this way the container 10 and support 20 are held snugly together.

It will be noted from Figure 1 that two supporting members 20 are utilized, one at each end of the fishing tackle box. The upper hook end 23, 25 of the supports are hung over the gunwale with the rod portion 21 brought very snug against the inside surface of the gunwale. Upon the straight horizontal portion 23 of the hook there is a clamp 30 which has a bent end portion 31 furnished with a resilient pad 32 of sponge rubber, felt or the like. The clamp 30 is provided with an elongated gripping slot similar to that shown in Figure 3. The clamp is pressed toward the gunwale until the pad 32 is compressed tightly against the outer surface of the gunwale. The resiliency of the pad 32 tends to rotate the entire clamp in a clockwise direction as shown in Figure 2, and this causes the slot in clamp 30 to be brought into a position such that the sides of the slot tightly grip the rod 23 thereby holding the clamp 30 in position. It will be remembered that the slot in the clamp 30 is of the same variety described with reference to Figure 3, the upper end of the slot (corresponding to 24C of Figure 3) being narrowed slightly so as to grip the rod 23. Thus each of the hooks 20 are attached to the gunwale and the box.

In order to remove hook structures 20 from the gunwale, it is only necessary to press the portion 31 of the clamp 30 in a counter-clockwise direction thereby compressing the pad support 32. This tends to loosen the clamp from the straight rod portion 23 at which time the entire clamp can be slipped along the rod until it engages end 25 and the hook 23, 25 is then free. In order to lift the clip 24 from engagement with the upper edge of the container, it is only necessary to pull up on the left portion of the clip as shown in Figure 2. This tends to straighten the clip to a position more at right angles to the rod at 22 at which it can be lifted. Also the portion 21 of the support can be sprung a little towards the box sidewall 10S. Each of the supports 20 can then be detached and carried in a fishing tackle box when not in use.

Referring to Figure 4 there is illustrated a similar form of the invention except that the clip 24 is replaced by a retainer 40 having a tubular portion 41 which is free to slide up and down on vertically extending part 21 of the support. The tube has a rod 43 welded or otherwise attached to it. Rod 43 is bent so as to be spaced outwardly from tube 41 and thus leave a space 44. The rod 42 continues downwardly in spaced relationship to the tube 41 and terminates in an outward bend at 45. In using this kind of retainer the entire structure 40 is moved toward the hook end 23, 25 and the tray portion 10 of the opened fishing tackle box is brought into position so that the bottom 10B rests upon lower portion 22. If necessary the container portion 10 may be tipped sufficiently so as to enter the upper edge 10E into the space 44 behind the end 45. The retainer 40 is then lowered until either portion 45 engages the bottom 10B of the box (in the event the container portion 10 of the box is shallower than the dimension D of the retainer) or until the bend 41 of the retainer engages the upper edge 10E of the box (as where the container 10 is deep). In either event, the retainer 40 will hold the entire sidewall 10S of the container in the space 44 between rods 42 and the tube 41 and thus secure the assembly 20 to the box. If desired, the rod 42 may be made resilient and formed so as resiliently to engage the inside of tray sidewall 10S and hold it against rod 21.

The entire support per se is held in place as previously described. However, in this instance, the clamp 30 has an inward extending end 33 which holds well on those types of boats where the gunwale has an outer buffer strip. End 33 tends to hold the supporting structure 20 from any upward movement and provides end support for the compressible pad 32 of rubber, felt or the like.

Figure 5:
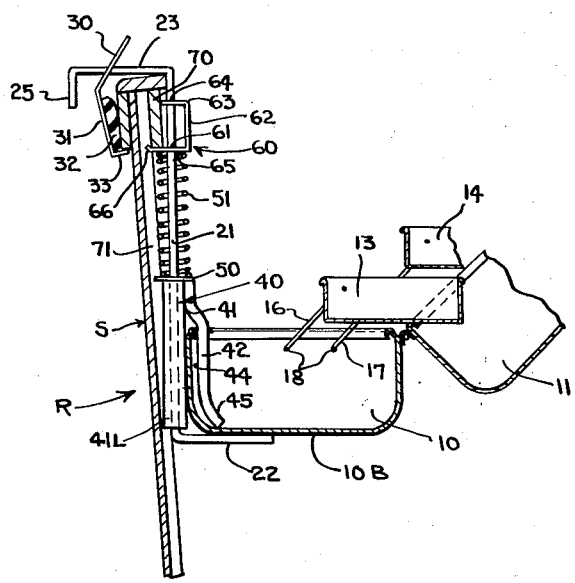
Figure 5 is an end elevational view, similar to Figures 2 and 4, illustrating a further modified form of the invention.

According to the structure shown in Figure 5, the general configuration is as previously described for the supporting structure 20, the hook 23, 25 and clamp 30—31 being as previously specified. Likewise, the support 20 has a lower end portion 22 which engages the bottom 10B of the container 10 of the fishing tackle box. In general form the retainer 40 is of the type shown in Figure 4 but it will be noticed that in this instance a washer is provided at 50 upon which a spring 51 seats, the upper portion of the spring abutting against an upper clip 60. The clip 60 is made of metal strap iron and is apertured at 61 so that the portion 21 of the support will pass through. The clip 60 also includes vertically extending part 62 and an inwardly bent upper end portion 63 which is provided with a notch at 64 to embrace the rod 21. The clip 60 has a lower portion 65 which extends under and against the gunwale and has a terminal end 66. In use, the clip 60 is pushed upwardly and at the same time the retainer 40 is pushed downwardly by the action of spring 51. The net result is that the clip 60 is held upwardly against the inner trim strip 70 of the gunwale which in most cases seats on the inside of the ribs 71 of the boat. At the same time the retainer 40 is held downwardly and hence holds the tackle box securely locked to the support 20.

It is apparent that many modifications and variations of this invention as herein set forth may be made without departing from the spirit and scope thereof. These specific embodiments described are given by way of example and the invention is limited only by the terms of the appended claims.

I claim as my invention:

1. A hanger to bear on a support member for supporting a container having a bottom and a side wall which terminates at an upper edge, comprising an upright bar having a support arm formed integral therewith to extend approximately at right angles thereto, a bent portion formed integral with said bar in spaced relationship to the support arm to extend in the opposite direction from the bar relative to the support arm for mounting said hanger on the support member and a clip having a support portion and a depending portion formed integral therewith, said clip mounted on said bar to have the depending portion extend in a downward direction, said support portion having an elongated opening formed therein to have the bar extended therethrough, the length of said opening being substantially greater than the corresponding cross-sectional dimension of said bar and the width of said opening being narrower from the end of opening from the rest from the depending portion to a dimension at the opposite end that is smaller than the corresponding cross-sectional dimension of said bar, said support portion forming a binding engagement with the upright bar when the support portion is pushed downwardly below the top edge of a container supported on said support arm and the depending portion has extended into said container in engagement with said container.

2. A hanger for supporting a container having a bottom and a sidewall which terminate at an upper edge, comprising a bar having a lower support portion for engaging the underside of the container bottom, an upwardly extending portion connected to said lower support portion to extend along the outer surface container sidewall to a position above the upper edge of said container sidewall, a bent portion connected to the upwardly extending portion and spaced from the support portion to engage and be supported from a horizontally extending support member, and a clip having a container engaging portion configured to be spaced from the upwardly extending portion and to extend downwardly inside of the container sidewall and a retainer portion slidably mounted on the upwardly extending portion, said retainer portion connected to the container engaging portion to extend at a sharp angle relative to said container engaging portion, said retainer portion having an opening through which said upwardly extending part extends, said opening shaped such that a force applied to the clip having a largest vectorial component thereof directed outwardly from the upwardly extending portion toward the container is transmitter through the retainer portion to be exerted thgainst the upwardly extending portion, the opening in said clip being an elongated slot through which the bar passes, said slot being narrowed so as to pinch the bar and become tightly engaged thereto when the clip is tipped by a force exerted in the direction away from the lower support and against the engaging portion of the clip.

3. For supporting a container from a support member having opposite vertical sides, a hanger comprising an upright bar, means secured to the lower end of the bar for supporting a container, a hanger bent portion formed integral with the upper end of said bar to extend outwardly from said bar, a clamp having an upper end portion and a depending bent end portion formed integral with said upper end portion, said depending bent end portion having an engaging surface directed toward the upright bar, said upper end portion having a single opening therein through which the hanger bent end portion is extended, and shaped for pivotally-slidably mounting the clamp on said hanger bent end portion and forming a binding engagement with said hanger bent end portion upon pivoting the upper end portion of the clamp toward the upright bar with the depending portion in engagement with one vertical side of the support member and the upright bar engaging the opposite side of said support member.

4. The structure of claim 3 further characterized in that the clamp includes a resilient pad on the depending portion to form the engaging surface thereof, the hanger bent end portion extends in a generally horizontal direction and the upper end portion is elongated in a vertical direction.

5. The structure of claim 3 further characterized in that the opening is shaped to have a length in a vertical direction substantially greater than the corresponding cross-sectional dimension of said hanger bent end portion and the width of said opening at one end being narrower than the corresponding cross sectional dimension of said hanger bent end portion and at the other end greater than the corresponding cross sectional dimension of the hanger bent end portion.

6. For supporting a container from a support member having opposite vertical sides, a hanger comprising a bar having an upright central suspension portion, an upper and a lower end to extend outwardly from said central portion at appropriate right angles thereto, means mounted on said central portion for retaining the container on the lower end of the bar, means mounted on said upper end for clampingly engaging the supporting surface between a portion of said means and the upright portion said last mentioned means having an elongated opening formed therein which is shaped to slidably-pivotally mount said last mentioned means along the length of said upper end, the last mentioned means being freely slidable on the upper end when the plane of the opening is at approximately right angles to the upper portion and when the means on the upper end is pivoted relative to the upper end, said last mentioned means forming a binding engagement with the support member.

7. The structure of claim 6 further characterized in that the first mentioned means is a clip having an opening therein of the same shape as the opening in the last mentioned means.

References Cited in the file of this patent

UNITED STATES PATENTS

| | | |
|---|---|---|
| 807,562 | Lawrey | Dec. 19, 1905 |
| 895,047 | Schraudner | Aug. 4, 1908 |
| 1,019,151 | Holmes | Mar. 5, 1912 |
| 1,394,529 | Armitage | Oct. 25, 1921 |
| 1,446,036 | Dodd | Feb. 20, 1923 |
| 1,748,227 | Hyams | Feb. 25, 1930 |
| 2,119,483 | Kornelorfer et al. | May 31, 1938 |
| 2,367,256 | Atkins | Jan. 16, 1945 |
| 2,448,628 | Schaller | Sept. 7, 1948 |
| 2,544,312 | Hamilton | Mar. 6, 1951 |
| 2,631,807 | Witt | Mar. 17, 1953 |
| 2,678,791 | McPhaclen | May 18, 1954 |
| 2,711,873 | Larin | June 28, 1955 |
| 2,768,805 | Gribble | May 18, 1956 |
| 2,774,562 | Henry | Dec. 18, 1956 |

UNITED STATES PATENT OFFICE
CERTIFICATE OF CORRECTION

Patent No. 2,982,509   May 2, 1961

Kenneth J. Murray

It is hereby certified that error appears in the above numbered patent requiring correction and that the said Letters Patent should read as corrected below.

Column 5, line 15, for "transmitter" read -- transmitted --; line 16, for "thgainst" read -- against --.

Signed and sealed this 10th day of October 1961.

(SEAL)
Attest:

ERNEST W. SWIDER
Attesting Officer

DAVID L. LADD
Commissioner of Patents

USCOMM-DC